(12) United States Patent
Suzuki et al.

(10) Patent No.: US 10,399,488 B2
(45) Date of Patent: Sep. 3, 2019

(54) STRUCTURE FOR ASSEMBLING VEHICLE INTERIOR LIGHTING

(71) Applicant: YAZAKI CORPORATION, Tokyo (JP)

(72) Inventors: Yasuo Suzuki, Makinohara (JP); Hideki Yamanaka, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 756 days.

(21) Appl. No.: 14/302,709

(22) Filed: Jun. 12, 2014

(65) Prior Publication Data

US 2014/0293636 A1    Oct. 2, 2014

Related U.S. Application Data

(63) Continuation of application No. PCT/JP2012/083164, filed on Dec. 14, 2012.

(30) Foreign Application Priority Data

Dec. 14, 2011  (JP) .................................. 2011-273705

(51) Int. Cl.
*B60Q 3/88* (2017.01)
*B60Q 3/51* (2017.01)

(52) U.S. Cl.
CPC .................. *B60Q 3/88* (2017.02); *B60Q 3/51* (2017.02)

(58) Field of Classification Search
CPC ........ B60Q 3/007; B60Q 3/0203; B60Q 3/51; B60Q 3/88
USPC ........................................ 362/488, 520, 657
See application file for complete search history.

(56) References Cited

U.S. PATENT DOCUMENTS

| 5,497,306 A | 3/1996 | Pastrick |
| 2002/0041496 A1 | 4/2002 | Hatagishi et al. |
| 2009/0183915 A1 | 7/2009 | Suzuki |
| 2010/0195348 A1 | 8/2010 | Ohtsuka et al. |

FOREIGN PATENT DOCUMENTS

| CN | 101386280 A | 3/2009 |
| CN | 101492033 A | 7/2009 |
| DE | 101 48 107 A1 | 10/2002 |

(Continued)

OTHER PUBLICATIONS

International Search Report dated Mar. 28, 2013 issued in International Application No. PCT/JP2012/083164 (PCT/ISA/210).

(Continued)

*Primary Examiner* — Anh T Mai
*Assistant Examiner* — Jessica M Apenteng
(74) *Attorney, Agent, or Firm* — Sughrue Mion, PLLC

(57) ABSTRACT

A structure for assembling a vehicle interior lighting, comprises a lens, a socket, a cover fitted to the socket, a first regulation portion configured by one side of the fitted cover or the fitted socket that is located on a front side in the insertion direction and a part of the lens, the first regulation portion regulating forward movement of the cover or the socket in the insertion direction; and a second regulation portion configured by another side of the fitted cover or the fitted socket that is located on a rear side in the insertion direction and a part of the lens, the second regulation portion regulating backward movement of the cover or the socket in the insertion direction.

10 Claims, 8 Drawing Sheets

(56) References Cited

FOREIGN PATENT DOCUMENTS

DE    10 2010 001 501 A1    8/2010
JP        2010-179837 A      8/2010

OTHER PUBLICATIONS

Written Opinion dated Mar. 28, 2013 issued in International Application No. PCT/JP2012/083164 (PCT/ISA/37).
Office Action dated Sep. 6, 2015, issued by the State Intellectual Property Office of P.R. China in counterpart Chinese Application No. 201280061979.2.
Communication dated Jun. 18, 2015 issued by the Korean Intellectual Property Office in counterpart Korean Patent Application No. 10-2014-7015928.
Office Action dated Dec. 16, 2014, issued by the German Patent and Trade Mark Office in counterpart German Application No. 10 2012 005 284.6.
Office Action dated Dec. 11, 2018 by the Intellectual Property Office of India in counterpart Indian Patent Application No. 4314/CHENP/2014.

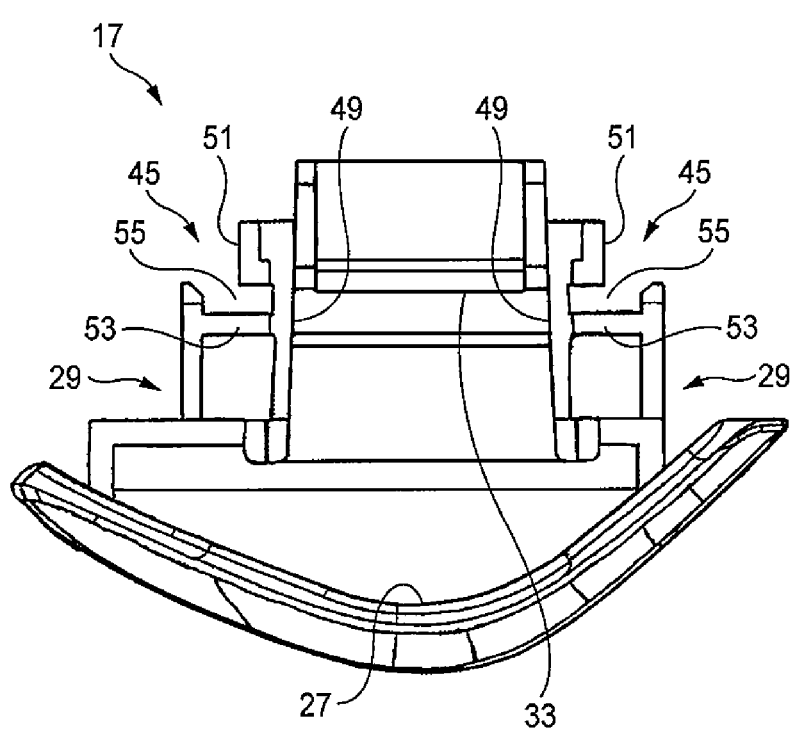

STRUCTURE FOR ASSEMBLING VEHICLE INTERIOR LIGHTING

CROSS REFERENCE TO RELATED APPLICATIONS

This application is a continuation of PCT application No. PCT/JP2012/083164, which was filed on Dec. 14, 2012 based on Japanese Patent Application (No. 2011-273705) filed on Dec. 14, 2011, the contents of which are incorporated herein by reference.

BACKGROUND OF THE INVENTION

1. Field of the Invention

The invention relates to a structure for assembling a vehicle interior lighting equipped with a cover for protecting a light source.

2. Description of the Related Art

In some vehicle interior lightings to be provided in vehicles, bulbs (electric bulbs) adopting filaments for light sources are employed (see; for instance, PTL 1).

FIG. 8 is an exploded perspective view of an existing vehicle interior lighting 501. The vehicle interior lighting 501 is equipped with a cover 507 as well as a design part 503 and a functional part 505 that are assembled into one. The design part 503, the functional part 505, and the cover 507 are fitted into an opening 511 made in an interior material 509 that is a mounting part, like an indoor ceiling of a vehicle. The design part 503 has a lens 515, a lock part 517, and a ceiling latch claw 519 that are all provided on a housing 513. Further, the functional part 505 is assembled integrally together with the housing 513. The lock part 517 has as a pair brackets 521 that oppose each other and latch projections 523 provided on inner side surfaces of the both brackets 521, wherein the brackets 521 possess flexibility that enable the brackets to bend to a certain extent to thereby broaden a spacing existing therebetween. The functional part 505 has a wire harness 525 and a mating lock part 527 that can be locked to the lock part 517.

The housing 513 is fitted from above and below into a frame-shaped roof trim 529 that assumes a convex shape toward a recess of the interior material 509. Specifically, the roof trim 529 is sandwiched between, from below, a bezel 531 making up an outer edge of the housing 513 as designated by a broken line and, from above, the ceiling latch claw 519 of the housing 513 and the functional part 505 to be secured to the housing 513. The vehicle interior lighting 501 is thereby attached to the interior material 509 in a removable manner.

The cover 507 exhibits a function of a reflector that reflects outgoing light from a light source 533 in a direction toward the lens 515 without leaking the light to the outside, and also exhibits dustproof, drip-proof functions, and the like, for the light source 533. The cover 507 is designed to protect the light source 533 of the functional part 505 from an external physical impact, in particular, when the vehicle interior lighting 501 is conveyed. The cover 507 is removably attached to the functional part 505. The cover 507 is retained by cover holding means 535 formed from a receiving groove that assumes a substantially-C-shaped geometry and that is formed in the housing 513.

The functional part 505 can be attached to the design part 503 while equipped with the cover 507 and has a geometry by means of which the functional part 505 passes through the opening 511. When the functional part 505 is attached to the mounting part of a vehicle by means of assembling operation, the cover 507 protects the light source 533, so that infliction of damage to the light source 533 and the neighborhood of the mounting part of the vehicle can be avoided.

CITATION LIST

Patent Literature

[PTL 1] JP-A-2010-179837

SUMMARY OF THE INVENTION

However, even when the cover 507 was forgotten to be attached to the existing vehicle interior lighting 501, the functional part 505 and the design part 503 can be fixed to the opening 511 of the interior material 509. In relation to the vehicle interior lighting 501 not equipped with the cover 507, a mount position of the cover 507 is located on the back of the interior material 509 as a result of being covered with the lens 515, so that the cover cannot be easily viewed. For this reason, missing of the cover 507 is found only by means of unevenness, or the like, in outgoing light due to an operation failure in the reflector occurred during illumination of the lighting, which in turn causes laborious work for disassembling and reassembling the design part 503 and the functional part 505 in a subsequence process flow.

The invention has been conceived in light of the invention and aims at providing a structure for assembling a vehicle interior lighting that can prevent a worker from forgetting to attach a constituent component.

The object of the invention is accomplished by the following configurations:

(1) A structure for assembling a vehicle interior lighting, comprising:
  a lens;
  a first engagement portion and a second engagement portion that are disposed on a light source opposed surface of the lens and spaced apart from each other in a linear direction while the linear direction along the light source opposed surface is taken as an insertion direction;
  a socket to which a light source is fitted and that has a socket-side engagement portion to be engaged with the second engagement portion;
  a cover fitted to the socket in a direction along the linear direction so as to accommodate the light source therein and cover the light source, and having a cover-side engagement portion engaged with the first engagement portion;
  a first regulation portion configured by one side of the fitted cover or the fitted socket that is located on a front side in the insertion direction and a part of the lens, the first regulation portion regulating forward movement of the cover or the socket in the insertion direction; and
  a second regulation portion configured by another side of the fitted cover or the fitted socket that is located on a rear side in the insertion direction and a part of the lens, the second regulation portion regulating backward movement of the cover or the socket in the insertion direction.

In the structure for assembling a vehicle interior lighting having the configuration described in connection with (1), the socket and the cover are fitted together and then attached to the lens while they remain fitted together. The socket and the cover that are assembled into one are moved in the linear direction along the light source opposed surface of the lens. Thereby, the cover-side engagement portion is engaged with the first engagement portion, and the socket-side engagement portion is engaged with the second engagement portion. The socket and the cover are thus attached to the lens. The socket and the cover that are assembled into one are inserted to a predetermined position while remaining engaged with the first engagement portion and the second engagement portion. When the socket and the cover that are assembled into one have arrived at a predetermined insert position, the first regulation portion regulates forward movement of the socket and the cover that are assembled into one in the insertion direction. The second regulation portion regulates backward movement of the socket and the cover that are assembled into one in the insertion direction. Drop of the socket and the cover from the lens is hindered, and fixing of the socket and the cover is thus completed. On the contrary, for instance, when only the socket is moved in the linear direction along the light source opposed surface of the lens as a result of the cover not being fitted to the socket, the socket-side engagement portion of the socket is engaged with the second engagement portion, thereby the second regulation portion is latched. The socket cannot undergo a linear movement regulation effect, which would otherwise be induced by the first regulation portion and the second regulation portion when the socket is integrally fitted to the cover. Thus, the socket-side engagement portion moves away from the second engagement portion, so as to be unable to be fixed. By means of the state in which the socket cannot be attached, the cover is detected as being left unattached.

(2) In the structure for assembling a vehicle interior lighting having the configuration described in connection with (1), the cover is located on the front side in the insertion direction.

In the structure for assembling a vehicle interior lighting having the configuration described in connection with (2), the cover is located on the front side in the insertion direction. Accordingly, when the cover and the socket that are assembled into one are inserted, the cover and the socket can be attached to the lens while the socket side that is larger in mass is held, so that fitting work becomes stable.

(3) In the structure for assembling a vehicle interior lighting described in connection with (2), the cover-side engagement portion is provided on both sides of the cover that are provided along the linear direction, and the socket-side engagement portion is provided on both sides of the socket that are provided along the linear direction.

In the structure for assembling a vehicle interior lighting having the configuration described in connection with (3), the cover is engaged with the lens by the cover-side engagement portion provided on the both sides of the cover. The socket is engaged with the lens by the socket-side engagement portion provided on both sides of the socket. Anchorage strength developing among the cover, the socket, and the lens is enhanced.

(4) In the structure for assembling a vehicle interior lighting described in connection with (1), the light source includes a bulb, and the bulb, the socket, the cover and a busbar make up a functional part.

(5) In the structure for assembling a vehicle interior lighting a described in connection with (1) the light source includes a bulb, and the cover surrounds the bulb.

The structure for assembling a vehicle interior lighting of the invention makes it possible to prevent a worker from forgetting to attach a constituent component.

The invention has been briefly described thus far. Details of the invention will become clearer by reading through an embodiment for implementing the invention to be described below (hereinafter called an "embodiment") by reference to the accompanying drawings.

BRIEF DESCRIPTION OF THE DRAWINGS

FIG. 3 is a front view of a lens shown in FIG. 2;

DETAILED DESCRIPTION OF THE EXEMPLARY EMBODIMENTS

Figure 1:
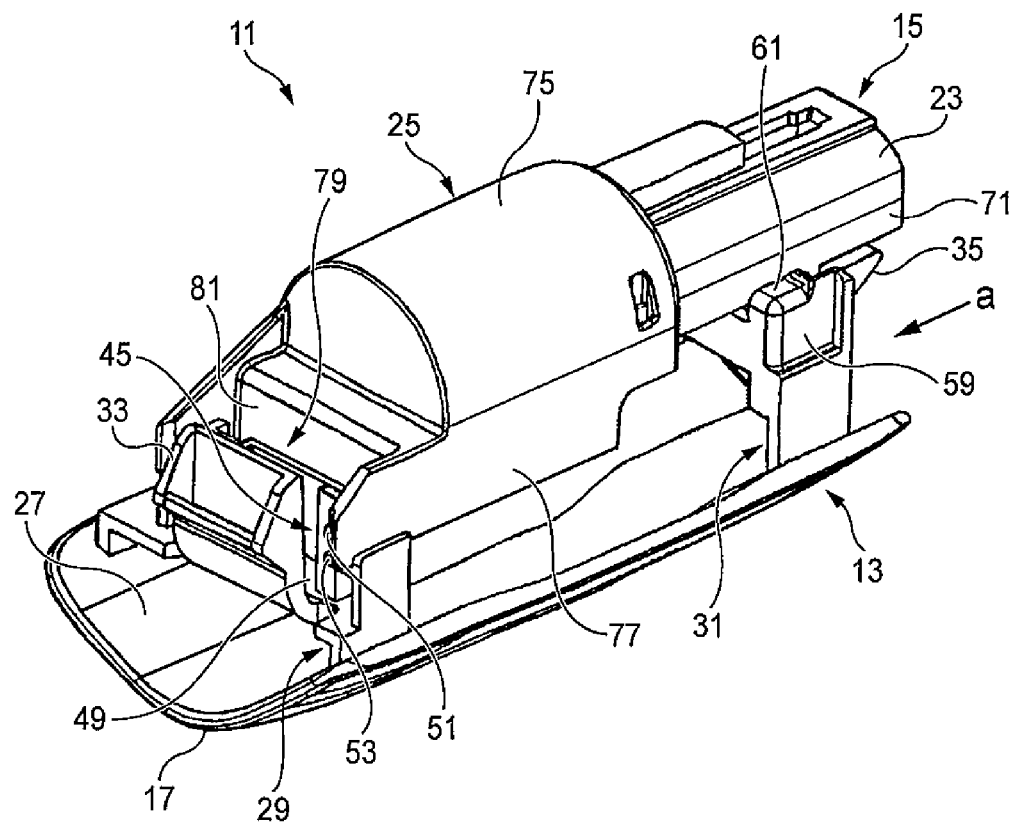
FIG. 1 is a perspective view showing an assembled state of a vehicle interior lighting of an embodiment of the invention.

An embodiment of the invention is hereunder described by reference to the drawings.

As shown in FIGS. 1 to 3 and FIGS. 4A and 4B, a vehicle interior lighting 11 of an embodiment of the invention has a design part 13 and a functional part 15 that are assembled into one. The design part 13 and the functional part 15 are fixedly fitted to an opening of an un-illustrated interior material that is a mounting part, such as a ceiling of a vehicle. The design part 13 is made up of a lens 17. The functional part 15 is made up of a bulb 19 that is a light source, a bus-bar 21, a socket 23, and a cover 25.

The lens 17 is made up of a transparent or translucent synthetic resin; assumes a V shape when viewed from the front and a substantially rectangular shape when viewed in a planar direction; and allows passage of light from the bulb 19. A first support 29 and a second support 31 are formed integrally with the lens 17 on both longitudinal sides of a light source opposed face 27 of the lens 17. A ceiling latch elastic arm 33 is provided on the first support 29, and a ceiling latch projection 35 is provided on the second support 31.

The vehicle interior lighting 11 assumes a shape that enables the functional part 15 to pass through the opening while the design part 13 and the functional part 15 are assembled in one as shown in FIG. 1. The vehicle interior lighting 11 whose functional part 15 remains passed through the opening is attached in a removable fashion while the interior material is nipped by the ceiling latch elastic arm 33, the ceiling latch projection 35, and a lens outer edge 37. Therefore, the bulb 19 is protected by the cover 25 during assembly work, infliction of damage to the light source can be avoided.

The bulb 19 is a light bulb adopting a filament. The bus-bar 21 has springs 39 to be connected to the bulb 19 and terminals 43 to be connected to an un-illustrated connector provided in the socket 23.

The bulb 19 and the cover 25 are attached to the socket 23 after the bus-bar 21 has been attached to the socket 23, whereby the socket 23 turns into the functional part 15. The cover 25 exhibits a function of preventing scratching, cracking, or the like, of the bulb 19 and also protecting a surrounding area of the bulb from heat given off during illumination, and the like. In addition to this, the cover 25 exhibits a reflector function of surrounding the surrounding area of the bulb 19, to thus reflect outgoing light from the bulb 19 toward the lens 17, thereby enhancing utilization efficiency of light.

First engagement portions 45 and second engagement portions 47 (see FIG. 2) are provided on the light source opposed surface 27 of the lens 17. The first engagement portions 45 are formed on both sides of the first support 29. The second engagement portions 47 are formed on both sides of the second support 31. A linear direction (a direction of arrow "a" shown in FIG. 1) along the light source opposed surface 27 is a insertion direction of the first engagement portions 45 and the second engagement portions 47, and the first and second engagement portions 45 and 47 are spaced apart from each other along the linear direction.

As shown in FIG. 3, each of the first engagement portions 45 is made up of an L-shaped piece 51 and a bottom piece 53 that are formed on an outside of each of first support side walls 49 on the both sides of the first support 29. The first engagement portions 45 are engaged with both cover-side engagement portions 57 (see FIGS. 4A and 4B) that are formed on the cover 25 and will be described later, along a direction in which the cover-side engagement portions 57 are inserted into both first insertion engagement spaces 55 formed between the both L-shaped pieces 51 and the both bottom pieces 53.

Figure 2:
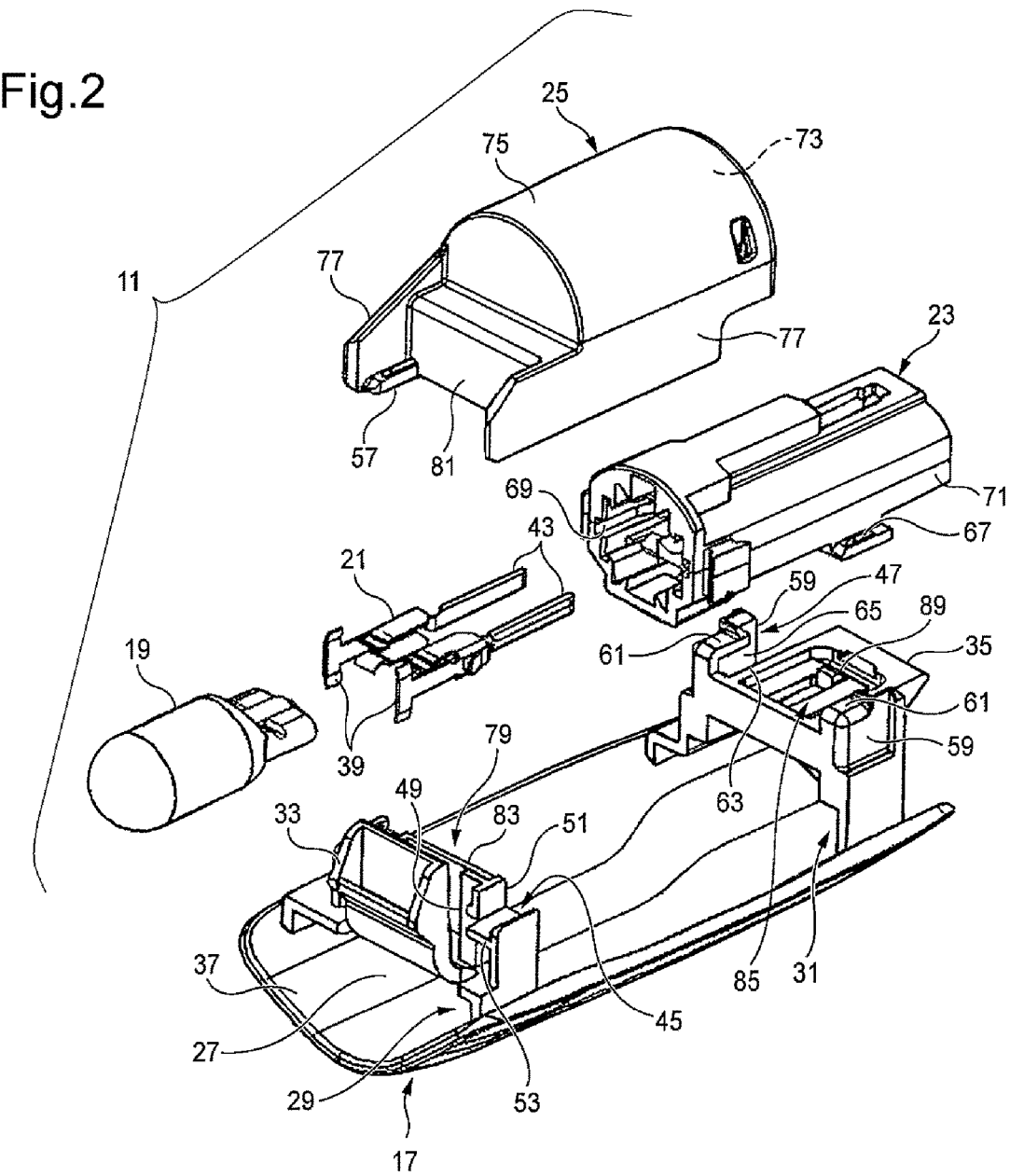
FIG. 2 is an exploded perspective view of the vehicle interior lighting shown in FIG. 1.

Each of the second engagement portions 47 is made up of an upper piece 61 and a lower frame piece 63 that are formed on an inside of each of the second support sidewalls 59 provided on the both sides of the second support 31 (see FIG. 2). The second engagement portions 47 are engaged with both socket-side engagement portions 67 that are formed on the socket 23 and will be described later, along a direction in which the socket-side engagement portions 67 are inserted into both second insertion engagement spaces 65 formed between the both upper pieces 61 and the both lower frame pieces 63.

The socket 23 is formed into a tubular shape, and one end of the socket 23 in its axial direction turns into a bulb mount opening 69. The bus-bar 21 and the bulb 19 are mounted to the socket 23 by way of the bulb mount opening 69. Throughout the specification, the vehicle interior lighting 11 is described while a side of the socket 23 facing the bulb mount opening 69 is taken as a front side and while the opposite side of the socket 23 is taken as a rear side. The rectangular wing-shaped socket-side engagement portion 67 is projectingly provided on each of socket both sides 71. The both socket-side engagement portions 67 are engaged with the both second insertion engagement spaces 65 of the second engagement portions 47.

Figure 4A:
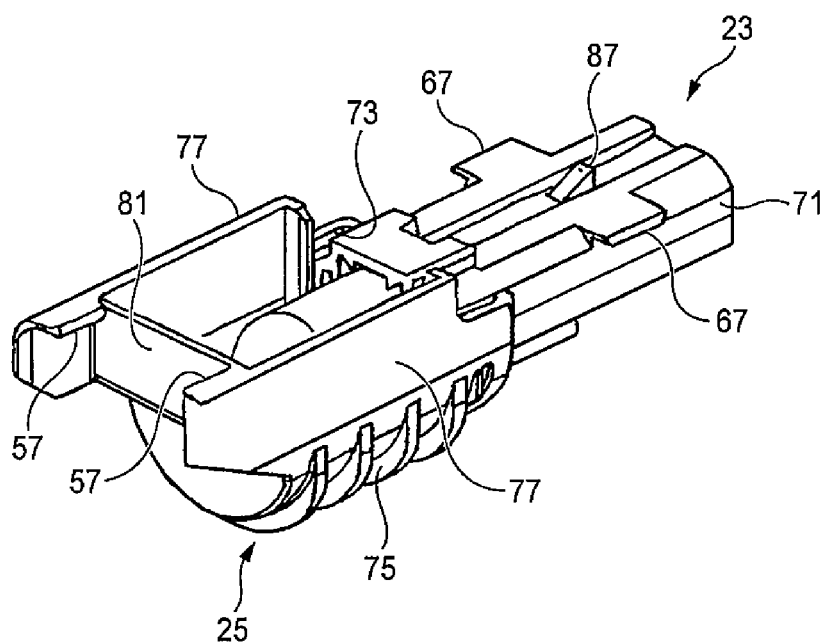
FIG. 4A is a perspective view of a cover and a socket from below.
Figure 4B:
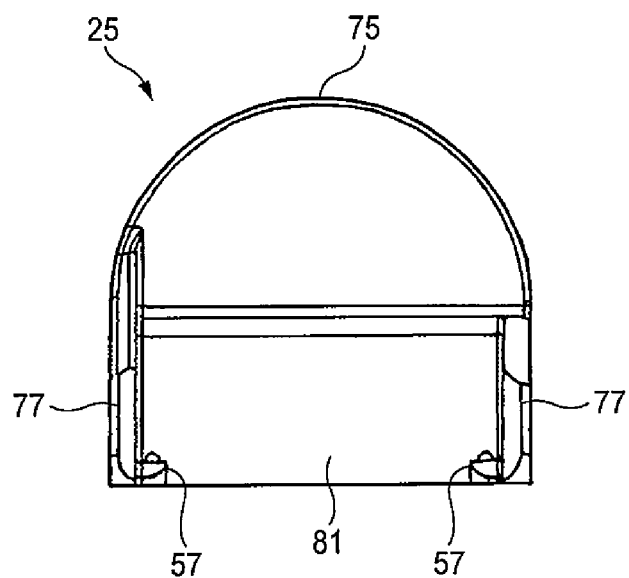
FIG. 4B is a front view of the cover.

As shown in FIGS. 4A and 4B, the cover 25 has at its back a socket fitting part 73. The cover 25 fits to the socket 23 in a direction along the linear direction by means of the socket fitting part 73, thereby covering and accommodating the bulb 19 therein. The cover 25 has a pair of cover both sides 77 on both sides of a reflector 75. Each of the cover-side engagement portions 57 to be engaged with the corresponding first engagement portion 45 is projectingly provided on an inside of a front portion of each of the cover both sides 77. Each of the cover-side engagement portions 57 is formed into a narrow elongated projecting shape that extends in the insertion direction and inserted into each of the first insertion engagement spaces 55.

In the vehicle interior lighting 11 of the embodiment, along the linear direction, the cover-side engagement portions 57 are provided on the cover both sides 77 of the cover 25 in the linear direction, and the socket-side engagement portions 67 are provided on the socket both sides 71 of the socket 23 in the linear direction.

The functional part 15 made up of the cover 25 and the socket 23 can be configured such that either longitudinal side of the functional part 15 is taken as a front side in the insertion direction. In the embodiment, the functional part 15 is configured in such a way that the cover 25 is located on the front side in the insertion direction.

In the vehicle interior lighting 11 of the embodiment, a first regulation portion 79 is provided over one side that is located on a front side of the fitted cover 25 or the fitted socket 23 (i.e., the functional part 15) in the insertion direction and the lens 17. Accordingly, in the embodiment, the first regulation portion 79 is provided across the cover 25 and the lens 17. The first regulation portion 79 is configured by a cover front wall 81 of the cover 25 and a supporting part rear wall 83 of the first support 29. The cover front wall 81 comes into contact with the supporting part rear wall 83, thereby regulating movement of the functional part 15 to the front along the insertion direction.

A second regulation portion 85 is provided across the other side of the vehicle interior lighting 11 that becomes a rear side when viewed in the insertion direction of the fitted cover 25 or the socket 23 and the lens 17. Accordingly, in the embodiment, the second regulation portion 85 is provided over the socket 23 and the lens 17. The second regulation portion 85 is configured by a socket lock projection 87 (see FIG. 4A) projectingly provided on an undersurface of the socket 23 and a supporting part lock projection 89 (see FIG. 2) projectingly provided on an upper surface of the second support 31. The functional part 15 locks the socket lock projection 87 to the supporting part lock projection 89, thereby regulating rear movement of the functional part 15 in the insertion direction.

Figure 5:
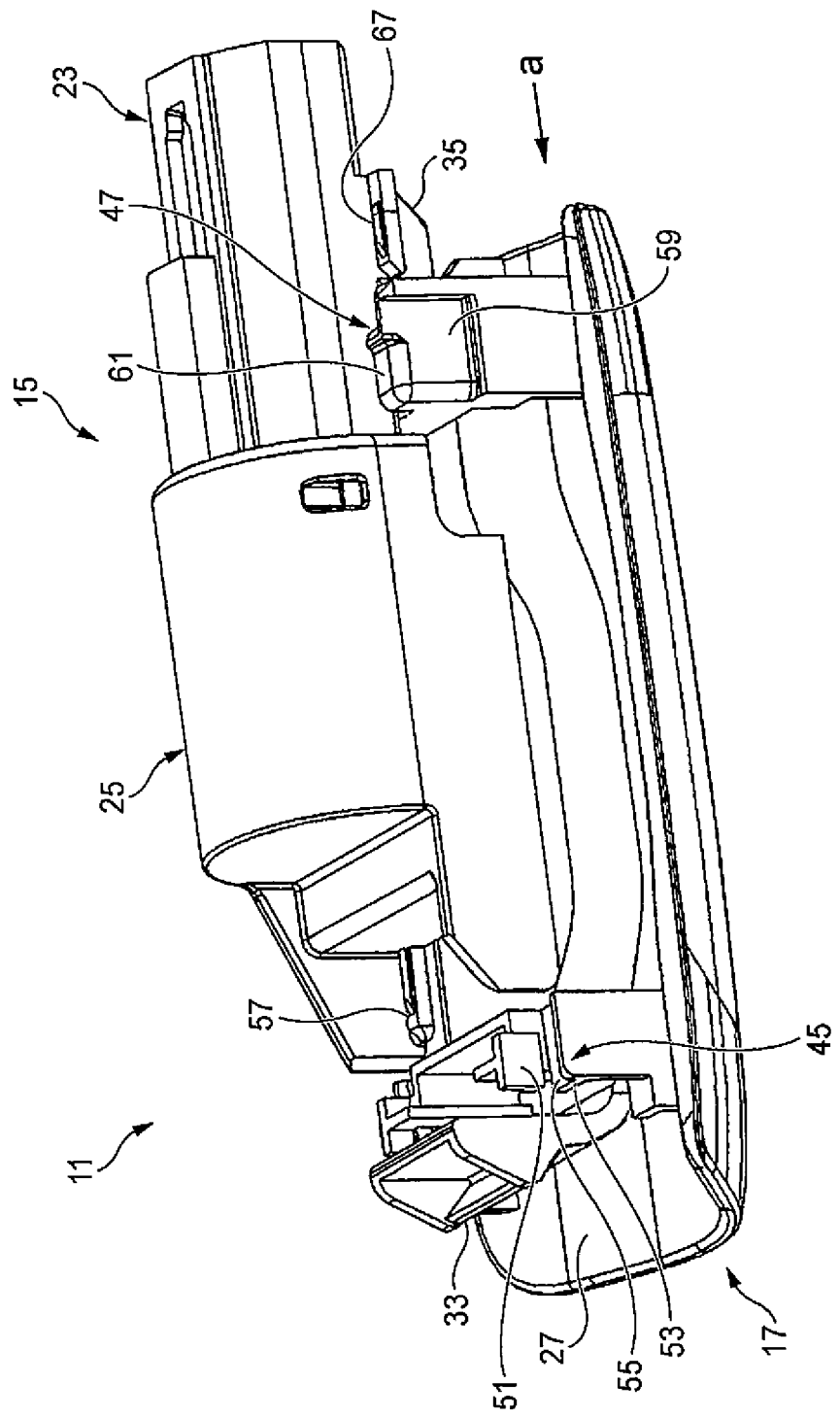
FIG. 5 is a perspective view of the cover and the socket achieved in the course of being inserted into the vehicle interior lighting.
Figure 6A:
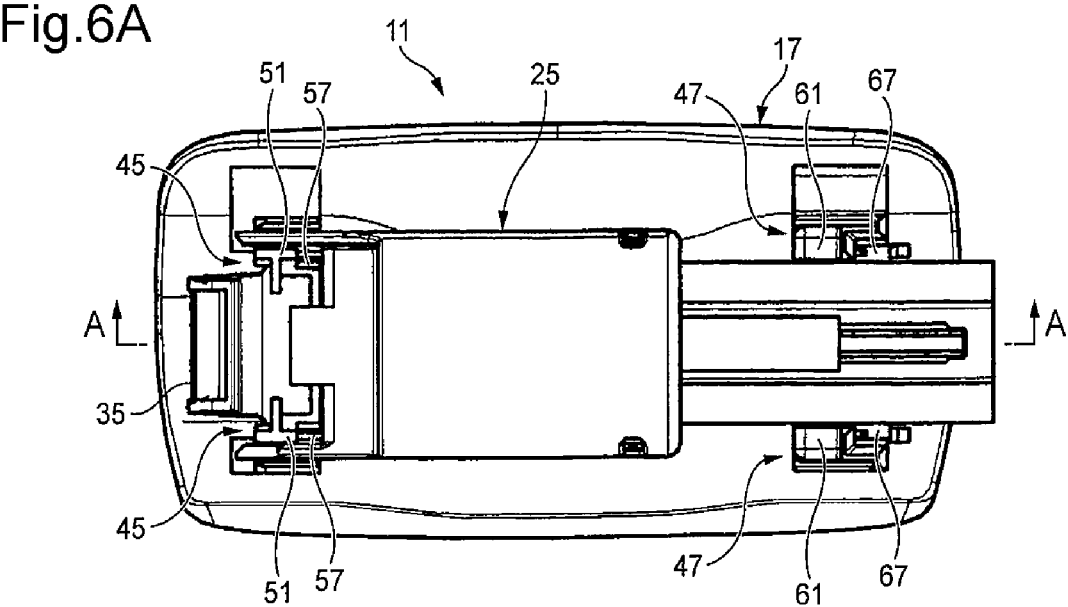
FIG. 6A is a plan view of the vehicle interior lighting achieved after completion of assembling operation and FIG. 6B is a cross sectional view taken along line A-A shown in FIG. 6A.

Operation of the vehicle interior lighting 11 having the above-mentioned configuration is now described by reference to FIGS. 5 and 6.

In order to assemble the vehicle interior lighting 11, the bus-bar 21 and the bulb 19 are first attached to the socket 23. The socket 23 and the cover 25 are fitted together, whereby the functional part 15 is assembled. Of the functional part 15, the cover 25 and the socket 23 are attached, while remaining fitted together, to the lens 17.

The socket 23 and the cover 25, which are assembled into one, are moved in the linear direction (a direction of arrow "a" in FIG. 5) along the light source opposed surface 27 of the lens 17. Thereupon, the cover-side engagement portions 57 are engaged with the first engagement portions 45, and the socket-side engagement portions 67 are engaged with the second engagement portions 47. The lens 17 is thus attached. The first engagement portions 45 and the cover-side engagement portions 57 that are thus engaged with each other are resistant to vertical removal (the vertical direction in FIG. 3) but can be disengaged from each other in the horizontal direction (the horizontal direction in FIG. 3) by dint of releasing force of a predetermined level or more.

Figure 6B:
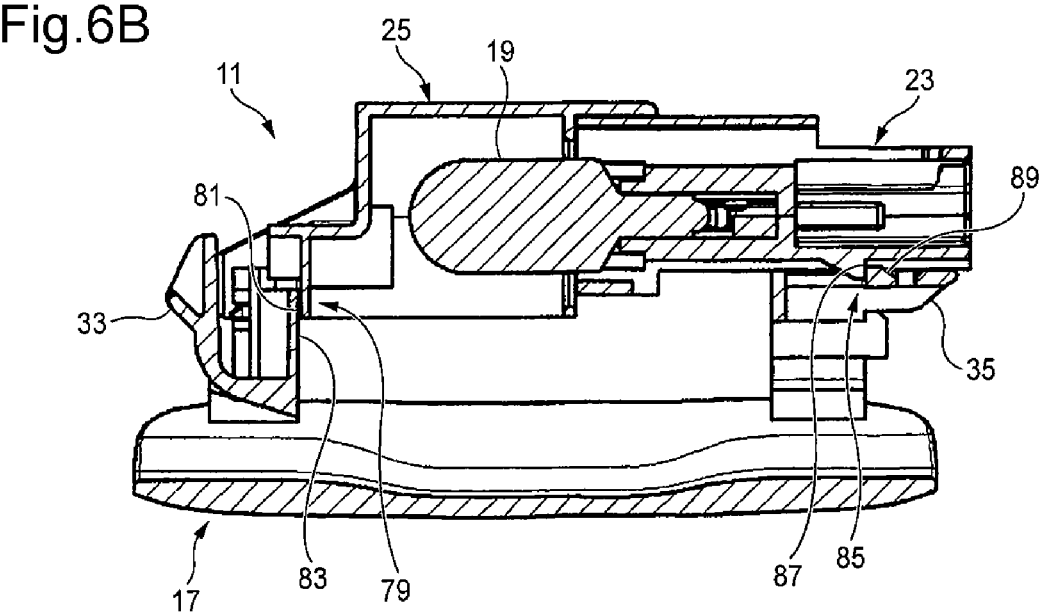

The socket 23 and the cover 25, which are assembled into one, are inserted into a predetermined position while being engaged with the first engagement portions 45 and the second engagement portions 47, bothly. When the socket 23 and the cover 25, which are assembled into one, have arrived at a predetermined insert position, the first regulation portion 79 regulates forward movements of the socket 23 and the cover 25 along the insertion direction as shown in FIG. 6B. Specifically, the cover front wall 81 and the supporting part rear wall 83 come into contact with each other.

Coincidentally, the second regulation portion 85 regulates backward movements of the socket 23 and the cover 25 along the insertion direction as shown in FIG. 6B. Specifically, the socket lock projection 87 and the supporting part lock projection 89 are latched with each other. Drop of the functional part 15 from the lens 17 is thereby prevented, so that fixing of the functional part 15 to the design part 13 is completed. The socket lock projection 87 and the supporting part lock projection 89 of the second regulation portion 85 are resistant to removal in a horizontal direction (a direction perpendicular to a drawing sheet of FIG. 6B) but can be disengaged from each other by dint of releasing force of a predetermined level or more in the vertical direction (the vertical direction of FIG. 6B).

Figure 7A:
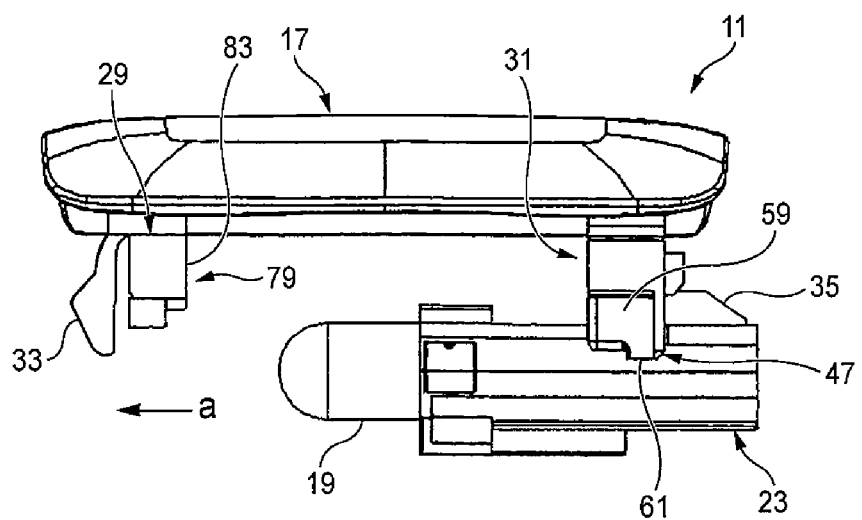
FIG. 7A is a side elevation of the vehicle interior lighting achieved when the socket not equipped with the cover is attached and FIG. 7B is a side elevation of the vehicle interior lighting whose socket is unlocked.

In contrast with the normal assembly, such as that mentioned above, as shown in; for instance, FIG. 7A, when only the socket 23 is moved without being fitted with the cover 25 in the linear direction (a direction of arrow "a" shown in FIG. 7A) along the light source opposed surface 27 of the lens 17, the socket-side engagement portions 67 of the socket 23 come into engagement with the second engagement portions 47, whereupon the socket lock projection 87 and the supporting part lock projection 89 are latched to each other. For this reason, the socket 23 cannot generate a linear movement regulation effect, which would otherwise be produced by the first regulation portion 79 and the second regulation portion 85 when the socket 23 is integrally fitted to the cover 25.

In addition to being unable to produce the linear movement regulation effect, the socket 23 cannot produce an effect of retaining an attitude along the light source opposed surface 27 as a result of being not supported by the first engagement portions 45 by way of the cover 25. Therefore, the socket 23 comes to allow itself to tilt with respect to the light source opposed surface 27. As a result of the socket 23 tilting, the socket lock projection 87 and the supporting part lock projection 89 of the second regulation portion 85 move away and deviate from each other in the vertical direction.

Figure 7B:
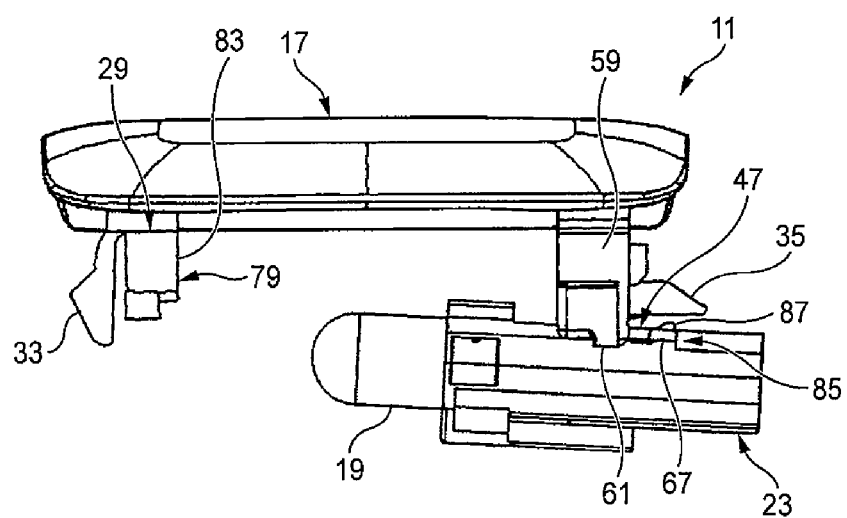
Figure 8:
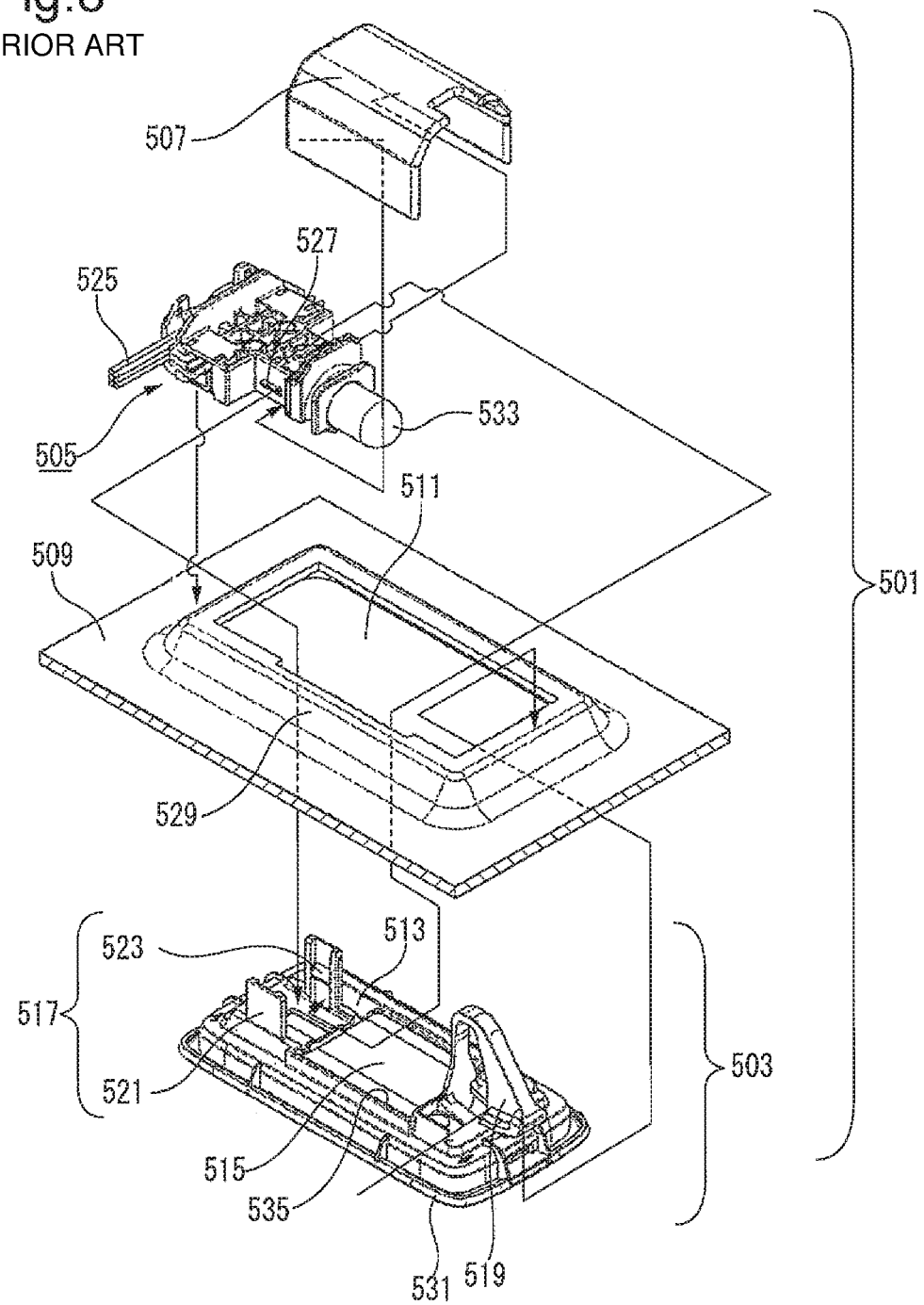
FIG. 8 is an exploded perspective view of an existing vehicle interior lighting.

Consequently, as shown in FIG. 7B, the socket-side engagement portions 67 move and break away from the second engagement portion 47 in the rearward direction, whereby the functional part 15 becomes impossible to be fixed, to thus drop. By means of the state in which the functional part 15 cannot be fixed, the cover 25 is detected as being left unattached. This makes it possible to prevent occurrence of a wrong part not equipped with the cover 25 (a part that differs from a production part).

Further, in the vehicle interior lighting 11 of the embodiment, on the occasion of insertion of the cover 25 and the socket 23 that are assembled into one, they can be fitted to the lens 17 while the socket side of the cover 25 that is larger in mass is held as a result of the cover 25 falling on the front side in the insertion direction, so that fitting work becomes stable.

Further, in the vehicle interior lighting 11 of the embodiment, the cover 25 is engaged with the lens 17 by means of the pair of cover-side engagement portions 57 provided on the cover both sides 77, and the socket 23 is also engaged with the lens 17 by means of the pair of socket-side engagement portions 67 provided on the socket both sides 71. Anchorage strength developing among the cover 25, the socket 23, and the lens 17 is enhanced.

Accordingly, the structure for assembling the vehicle interior lighting 11 of the embodiment makes it possible to prevent the socket 23 that is a constituent component from being left unattached.

The structure for assembling a vehicle interior lighting of the invention makes it possible to prevent a worker from forgetting to attach a constituent component.

What is claimed is:

1. A structure for assembling a vehicle interior lighting, comprising:
   a lens;
   a first engagement portion and a second engagement portion that are disposed on a light source opposed surface of the lens and spaced apart from each other in a linear direction extending along the light source opposed surface and corresponding to an insertion direction;
   a socket to which a light source is fitted and that has a socket-side engagement portion to be engaged with the second engagement portion;
   a cover configured to be fitted to the socket by movement in the linear direction so as to accommodate the light source therein and cover the light source, and having a cover-side engagement portion engaged with the first engagement portion;
   a first regulation portion configured by one side of the cover or the socket that is located on a front side in the insertion direction and forming a part of the lens, the first regulation portion regulating forward movement of the cover or the socket in the insertion direction; and
   a second regulation portion configured by another side of the cover or the socket that is located on a rear side in the insertion direction and forming a part of the lens, the second regulation portion regulating backward movement of the cover or the socket in the insertion direction.

2. The structure for assembling a vehicle interior lighting according to claim 1, wherein the cover is located on the front side in the insertion direction.

3. The structure for assembling a vehicle interior lighting according to claim 2, wherein the cover-side engagement portion is provided on both sides of the cover that are provided along the linear direction, and the socket-side engagement portion is provided on both sides of the socket that are provided along the linear direction.

4. The structure for assembling a vehicle interior lighting according to claim 1, wherein
   the light source includes a bulb, and
   the bulb, the socket, the cover and a busbar make up a functional part.

5. The structure for assembling a vehicle interior lighting according to claim 1, wherein
   the light source includes a bulb, and
   the cover surrounds the bulb.

6. The structure for assembling a vehicle interior lighting according to claim 1, wherein the forward movement is from the second engagement part to the first engagement part, and
   wherein the backward movement is from the first engagement part to the second engagement part.

7. The structure for assembling a vehicle interior lighting according to claim 1, wherein the cover is configured to prevent a socket lock projection, of the socket, from engaging a supporting part lock projection, of the second engagement portion, and wherein the engagement of the socket lock projection and the supporting part lock projection prevents the forward movement.

8. The structure for assembling a vehicle interior lighting according to claim 1, wherein the first engagement portion and the second engagement portion are integral with the lens and directly attached thereto.

9. The structure for assembling a vehicle interior lighting according to claim 1, wherein the lens is V-shaped as viewed from the insertion direction.

10. The structure for assembling a vehicle interior lighting according to claim 1, wherein the insertion direction is parallel to a longitudinal direction of the lens.

* * * * *